United States Patent
Adleman, Jr.

(10) Patent No.: US 9,651,446 B1
(45) Date of Patent: May 16, 2017

(54) APPLIANCE LEAK DETECTOR KIT

(71) Applicant: George Kenneth Adleman, Jr., Fruita, CO (US)

(72) Inventor: George Kenneth Adleman, Jr., Fruita, CO (US)

( * ) Notice: Subject to any disclaimer, the term of this patent is extended or adjusted under 35 U.S.C. 154(b) by 204 days.

(21) Appl. No.: 14/691,777

(22) Filed: Apr. 21, 2015

(51) Int. Cl.
*G01M 3/04* (2006.01)

(52) U.S. Cl.
CPC .................... *G01M 3/042* (2013.01)

(58) Field of Classification Search
CPC ................. G01M 3/04; G01M 3/042
USPC ...................... 116/200, 201; 73/40
See application file for complete search history.

(56) References Cited

U.S. PATENT DOCUMENTS

| | | | | |
|---|---|---|---|---|
| 5,133,167 A | * | 7/1992 | Drew et al. | E04B 9/0478 52/506.08 |
| 5,339,676 A | * | 8/1994 | Johnson | G01M 3/02 141/86 |
| 5,527,303 A | * | 6/1996 | Milby, Jr. et al. | A61F 13/5148 604/364 |
| 6,526,807 B1 | * | 3/2003 | Doumit et al. | G01M 3/04 340/605 |
| 6,715,365 B2 | * | 4/2004 | Davey | G01M 3/04 73/799 |
| 7,455,029 B2 | * | 11/2008 | Janesky | F24F 3/14 116/200 |
| 7,522,061 B2 | | 4/2009 | Rondoni et al. | |
| 8,094,031 B1 | * | 1/2012 | Herrera et al. | A61L 9/12 116/200 |
| 8,459,314 B2 | * | 6/2013 | Frazier et al. | G01M 3/04 137/313 |
| 8,884,769 B2 | | 11/2014 | Novak | |
| 9,482,589 B2 | * | 11/2016 | Ghodrati | G01M 3/042 |
| 2007/0207306 A1 | * | 9/2007 | Broughton et al. | B32B 5/18 428/304.4 |
| 2008/0307857 A1 | * | 12/2008 | Atiya | G01M 3/00 73/40 |
| 2013/0270141 A1 | * | 10/2013 | Anderson, Sr. et al. | G01M 3/38 206/459.1 |
| 2015/0102932 A1 | * | 4/2015 | Miller et al. | G08B 21/20 340/605 |

FOREIGN PATENT DOCUMENTS

DE   102007032250 B3 * 12/2008 ............. G01M 3/16
WO   WO 2015179488 A1 * 11/2015 ............ G01M 3/042

* cited by examiner

*Primary Examiner* — R. A. Smith
(74) *Attorney, Agent, or Firm* — Stevenson IP, LLC

(57) ABSTRACT

The appliance leak detector kit provides for completely mechanical leak detection with a red flag notification. A channel with a spring within is accessible via a longitudinal division within a rear side. A pair of holes in the rear side provides a spring anchor. The spring is extended outwardly from one of a pair of slots in the front wide, and fastened to a flagpole with flag. Another slot of the pair of slots provides for the flag to be held within the channel by a liquid soluble adhesive until a moisture wicked by an absorbent material migrates to the adhesive. The moisture causes the flag to release and pop distally from a front side of the channel, wherein a user notices a leak. A pair of absorbent material projections provides for a pair of slats that are part of the kit to install a remainder of the kit.

7 Claims, 4 Drawing Sheets

APPLIANCE LEAK DETECTOR KIT

BACKGROUND OF THE INVENTION

Of the various types of leak detectors known in the prior art, some are particularly suited to appliance leaks and to various plumbing leaks. An example is provided by those that can be fitted under a sink and under a plurality of appliances. A problem with such detectors is that they are typically battery operated. Remembering to change a battery is inconvenient. Electrical devices in a wet or humid environment can also be problematic. Complexity further exacerbates problems. What has been needed is a purely mechanical device that is inexpensively manufactured, easily installed, and easy to replace. The present kit provides these advantages.

FIELD OF THE INVENTION

The present appliance leak detector kit relates to leak detectors and especially to a leak detector that is particularly useful in detecting appliance leaks.

SUMMARY OF THE INVENTION

The general purpose of the appliance leak detector kit, described subsequently in greater detail, is to provide an appliance leak detector kit that has many novel features that result in an appliance leak detector kit which is not anticipated, rendered obvious, suggested, or even implied by prior art, either alone or in combination thereof.

To accomplish this, the appliance leak detector kit has a channel having a front side and a rear side spaced apart from the front side, a first end and a second end spaced apart from the first end, and a top side and a bottom side spaced apart from the top side. A wall is disposed on the front side top side. The wall is coplanar with the front side. A pair of mirror image scallops is selectively disposed within the channel. One of each of the pair of mirror image scallops is disposed within each of the first end and the second end, respectively. Each scallop of the pair of scallops is open from the rear side to proximal the front side. The channel is also produced without scallops. The scallops typically clear a pair of spaced apart feet of an appliance.

A longitudinal division is disposed continuously within the rear side proximal the bottom side. A pair of spaced apart holes is disposed in the rear side proximal the top side. The pair of holes form a spring anchor. A first slot and a second slot spaced apart from the first slot are disposed approximately centrally within the front side. A spring is disposed within the channel via the second slot. The spring has an origin and a terminus spaced apart from the origin. The origin is disposed within the pair of holes. The terminus extends without first slot of the pair of slots. A provided flagpole has an origination and a termination spaced apart from the origination. The origination is affixed to the terminus. A flag is disposed adjacent the termination.

A liquid soluble adhesive is disposed within the channel. The liquid soluble adhesive is configured to retain the flag within the first slot and within the channel. A provided absorbent material has a front end and a back end spaced apart from the front end, a first side and a second side spaced apart from the first side. The front side is disposed within the longitudinal division. The front side and adjacent the front side are in contact with the liquid soluble adhesive and the flag. The absorbent material wicks a leaked liquid from the appliance. The liquid leaked from any water pathway to the absorbent material is also potentially detected. The flag is configured to release from the liquid soluble adhesive upon a liquid exposure to the liquid soluble adhesive. The spring is configured to expose the flag distally from the front side upon a release of the liquid soluble adhesive, whether using a flagpole or without a flagpole, as the flag is selectively attached directly to the spring.

An installation of the kit is facilitated by a pair of spaced apart projections disposed within the absorbent material proximal the back end. A pair of slats is provided. Each slat of the pair of slats has a primary end and a secondary end spaced apart from the primary end. A cutout is disposed in each primary end. Each slat of the pair of slats has a length greater than a distance from the front end to the back end. Each cutout is configured to removably engage one of the projections of the pair of projections, respectively. As example, an installer places the kit upon a surface in front of which an appliance is located. The installer engages one of each of the pair of projections with one of each of the pair of cutouts. The slats are used to evenly push the kit under the appliance, with no wrinkling or binding of the absorbent material. The pair of slats is then pulled out, leaving the kit. The wall provides a finished look and fit to the kit and appliance.

Thus has been broadly outlined the more important features of the present appliance leak detector kit so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
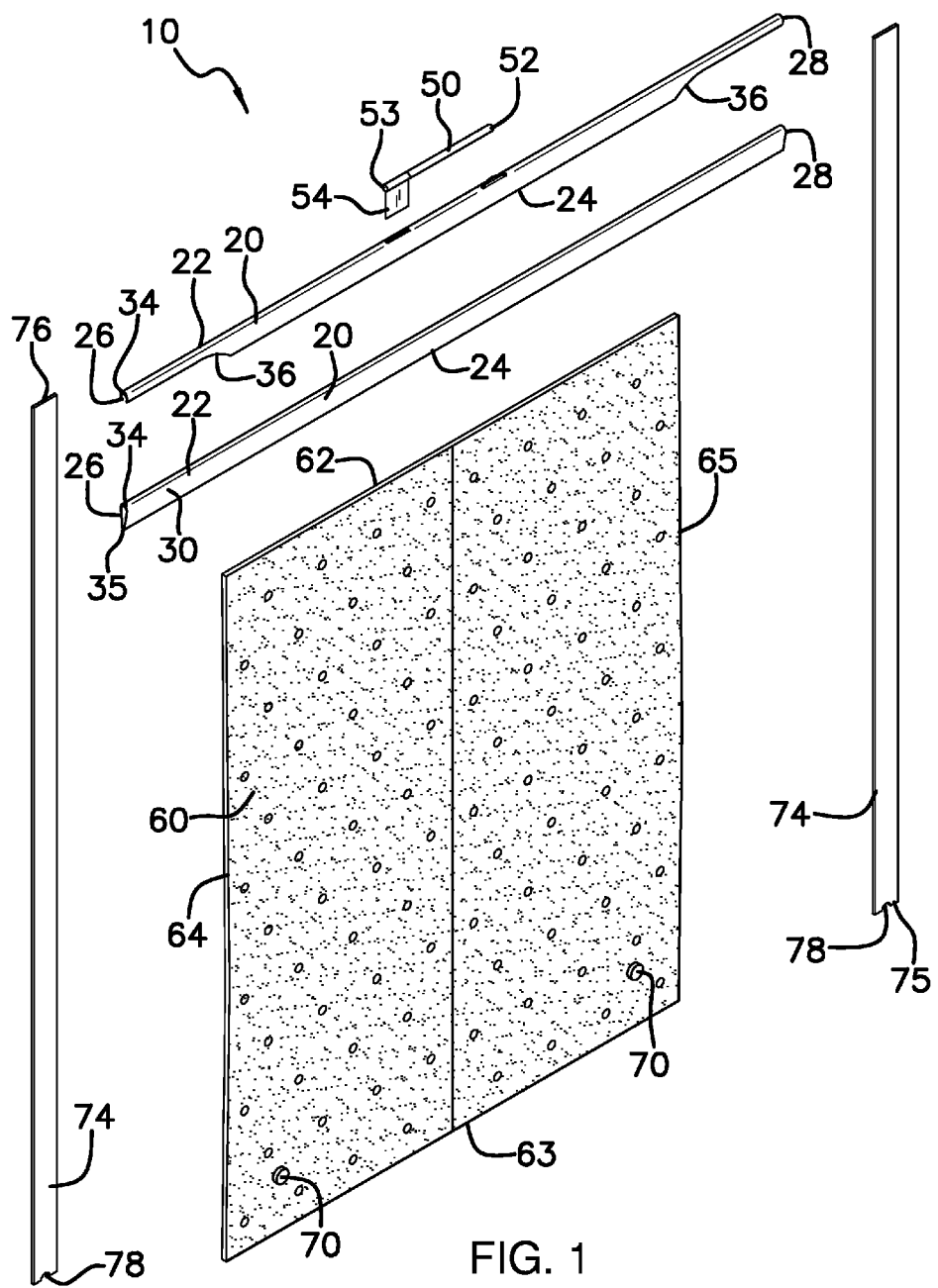
FIG. 1 is an exploded view.
Figure 2:
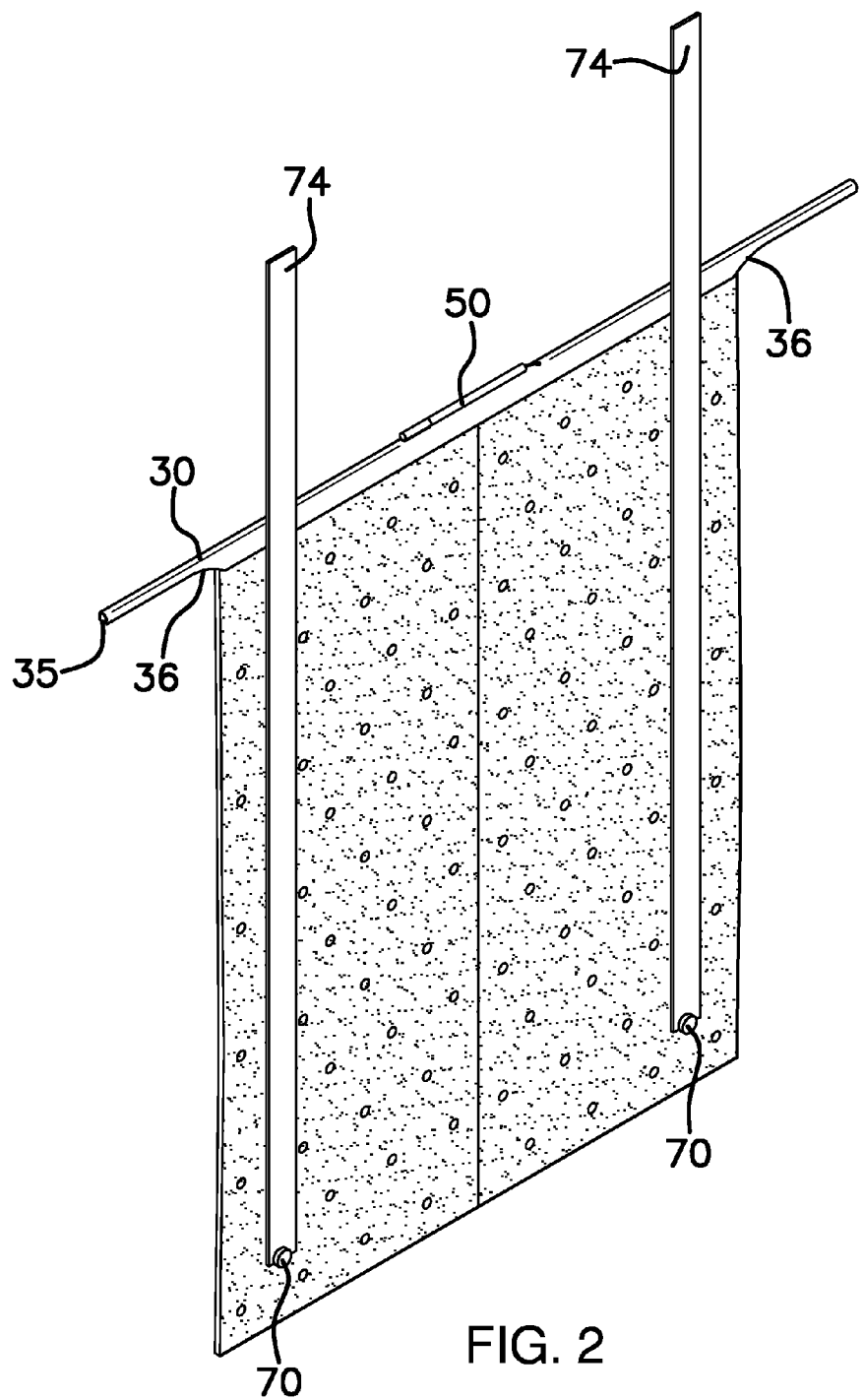
FIG. 2 is an assembled view.
Figure 3:
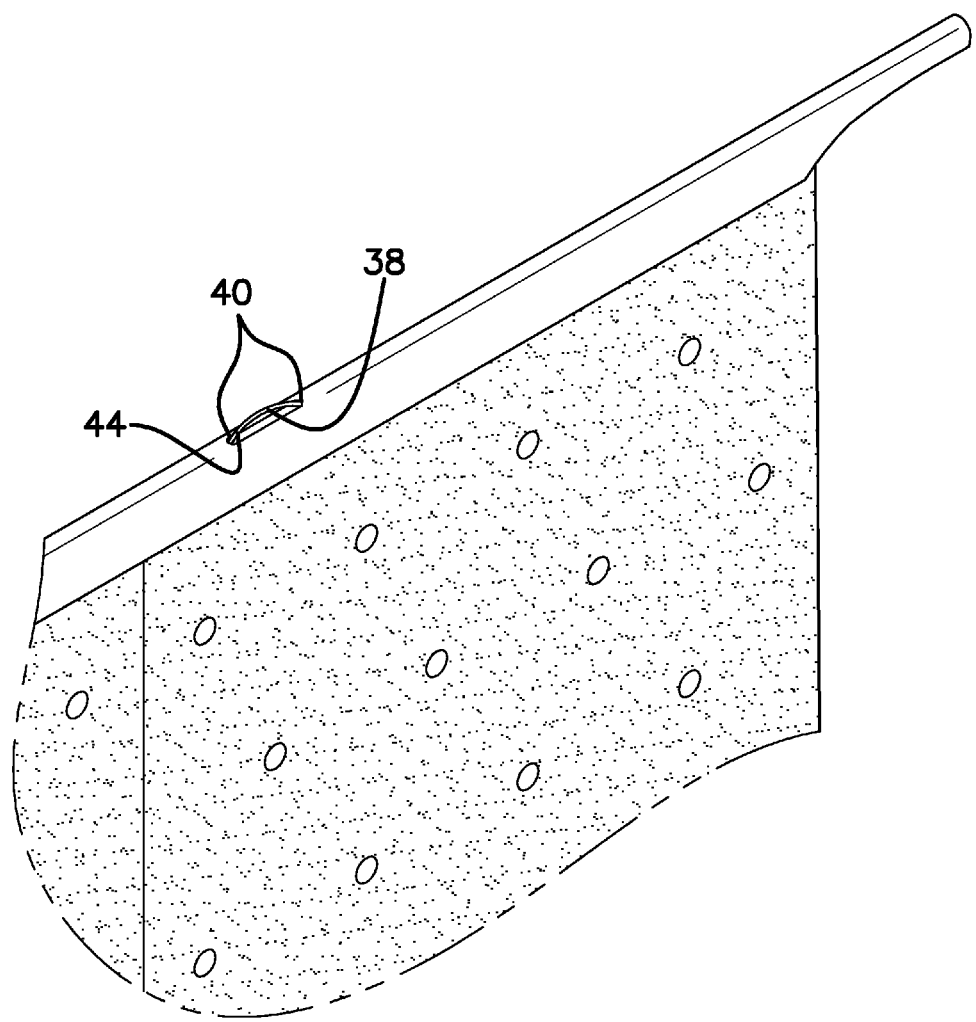
FIG. 3 is a rear side view.
Figure 4:
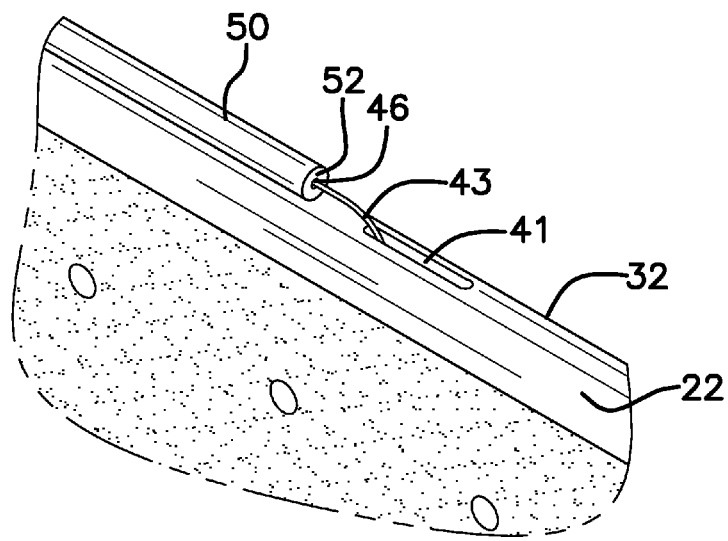
FIG. 4 is a front side view.
Figure 5:
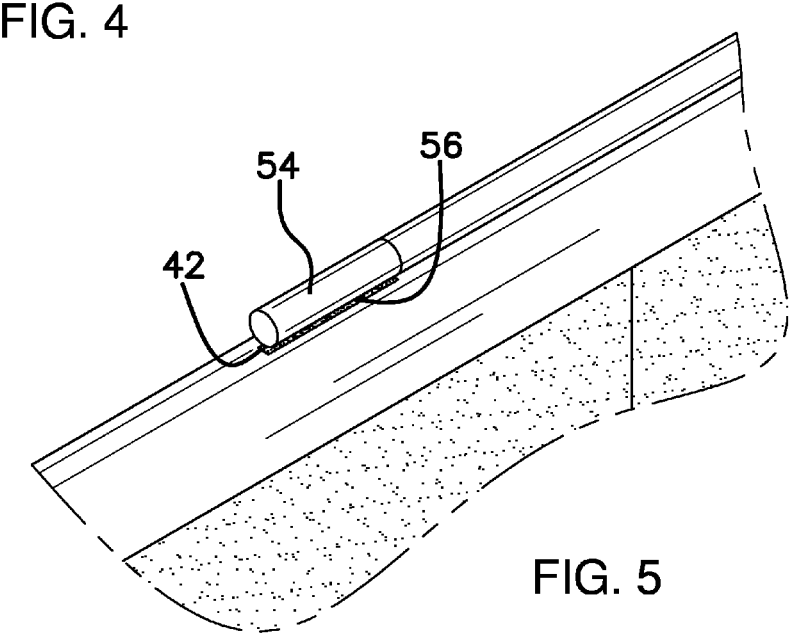
FIG. 5 is a front side view of a flagpole and a flag disposed within a second slot.

With reference now to the drawings, and in particular FIGS. 1 through 5 thereof, an example of the appliance leak detector kit employing the principles and concepts of the present appliance leak detector kit and generally designated by the reference number 10 will be described.

Referring to FIGS. 1 through 5, the appliance leak detector kit 10 has a channel 20 having a front side 22 and a rear side 24 spaced apart from the front side 22, a first end 26 and a second end 28 spaced apart from the first end 26, and a top side 30 and a bottom side 32 spaced apart from the top side 30. A wall 34 is disposed on the front side 22 top side 30. The wall 34 is coplanar with the front side 22. A pair of mirror image scallops 36 is disposed within the channel 20. One of each of the pair of mirror image scallops 36 is disposed within each of the first end 26 and the second end 28, respectively. Each scallop 36 of the pair of scallops 36 is open from the rear side 24 to proximal the front side 22 and substantially through the top side and the bottom side. The kit 10 is provided with channel 20 with a pair of scallops 36 and without a pair of scallops 36. The scallops 36 typically clear a pair of spaced apart feet of an appliance.

A longitudinal division 35 is disposed continuously within the rear side 24 proximal the bottom side 32. A pair of spaced apart holes 40 is disposed in the rear side 24 proximal the top side 30. A first slot 41 and a second slot 42 spaced apart from the first slot 42 are provided. The slots 41, 42 are disposed longitudinally and approximately centrally within the front side 22. A spring 43 is disposed within the channel 20. The spring 43 has an origin 44 and a terminus 46 spaced apart from the origin 44. The spring 43 is produced in wire stock, flat stock, and other forms of springs 42. The origin 44 is disposed within the pair of holes 40 that perform as a spring anchor 38. In consideration of production choices, the spring anchor 38 is provided in alternative designs. The spring 43 extends without the first slot 41. A provided flagpole 50 has an origination 52 and a termination 53 spaced apart from the origination 52. The origination 52 is affixed to the terminus 46. A flag 54 is disposed adjacent the termination 53.

A liquid soluble adhesive 56 is disposed within the channel 20. The liquid soluble adhesive 56 is configured to retain the flag 54 within the second slot 42 and the channel 20. A provided absorbent material 60 has a front end 62 and a back end 63 spaced apart from the front end 62, a first side 64 and a second side 65 spaced apart from the first side 64. The front end 62 is disposed within the longitudinal division 35. The front end 62 and adjacent the front end 62 are in contact with the liquid soluble adhesive 56 and the flag 54, within the channel 20. The absorbent material 60 wicks a leaked liquid from the appliance. The leaked liquid from any liquid pathway to the absorbent material 60 is also potentially detected. The flag 54 is configured to release from the liquid soluble adhesive 56 upon a liquid exposure to the liquid soluble adhesive 56. The spring 43 is configured to expose the flag 54 distally from the front side 22 upon a release of the liquid soluble adhesive 56, whether using a flagpole 50 or without a flagpole 50, as the flag 54 is selectively attached directly to the terminus 46.

An installation of the kit 10 is facilitated by a pair of spaced apart projections 70 disposed within the absorbent material 60 proximal the back end 63. A pair of identical slats 74 is provided. Each slat 74 of the pair of slats 74 has a primary end 75 and a secondary end 76 spaced apart from the primary end 75. A cutout 78 is disposed in each primary end 75. Each slat 74 of the pair of slats 74 has a length between the primary end 75 and the secondary end 76 greater than a distance from the front end 62 to the back end 63. Each cutout 78 is configured to removably engage one of the projections 70 of the pair of projections 70, respectively. As example, an installer places the kit 10 upon a surface in front of which the appliance is located. The installer engages one projection 70 of the pair of projections 70 with one cutout 78 of the pair of cutouts 78. The pair of slats 74 is used to evenly push a remainder of the kit 10 under the appliance, with no wrinkling or binding of the absorbent material 60. The pair of slats 74 is then pulled out, leaving the remainder of the kit 10. The wall 34 provides a finished look and function to the kit 10 and the appliance.

What is claimed is:

1. An appliance leak detector kit comprising:
   a channel having a front side and a rear side spaced apart from the front side, a first end and a second end spaced apart from the first end, a top side and a bottom side spaced apart from the top side, the channel having:
      a longitudinal division disposed continuously within the rear side;
      a spring anchor disposed in the rear side;
      a first slot and a second slot spaced apart from the first slot, the first slot and second slot disposed longitudinally and approximately centrally within the front side;
   a spring disposed within the channel, the spring having an origin and a terminus spaced apart from the origin, the origin affixed within the spring anchor, the terminus extended without the first slot;
   a flag disposed adjacent the terminus;
   a liquid soluble adhesive disposed within the channel wherein the liquid soluble adhesive is configured to retain the flag within the second slot; and
   an absorbent material having a front end and a back end spaced apart from the front end, a first side and a second side spaced apart from the first side, the front end disposed continuously within the longitudinal division, the front end and adjacent the front end in contact with the liquid soluble adhesive;
   wherein the flag is configured to release from the liquid soluble adhesive upon a liquid exposure; and
   wherein the spring is configured to expose the flag distally from the front side upon flag release.

2. The appliance leak detector kit of claim 1 wherein the spring is a wire spring.

3. The appliance leak detector kit of claim 1 wherein the spring is a flat spring.

4. An appliance leak detector kit comprising:
   a channel having a front side and a rear side spaced apart from the front side, a first end and a second end spaced apart from the first end, a top side and a bottom side spaced apart from the top side, the channel having:
      a wall disposed on the front side top side, the wall coplanar with the front side;
      a longitudinal division disposed continuously within the rear side;
      a spring anchor disposed in the rear side, the spring anchor comprising a pair of spaced apart holes;
   a first slot and a second slot spaced apart from the first slot, the first slot and second slot disposed longitudinally and approximately centrally within the front side;
   a spring disposed within the channel, the spring having an origin and a terminus spaced apart from the origin, the origin affixed within the spring anchor, the terminus extended without the first slot;
   a flagpole having an origination and a termination spaced apart from the origination, the origination affixed to the terminus;
   a flag disposed adjacent the termination;
   a liquid soluble adhesive disposed within the channel wherein the liquid soluble adhesive is configured to retain the flag within the second slot;
   an absorbent material having a front end and a back end spaced apart from the front end, a first side and a second side spaced apart from the first side, the front end removably disposed within the longitudinal division, the front end and adjacent the front end in contact with the liquid soluble adhesive and the flag;
   wherein the flag is configured to release from the liquid soluble adhesive upon a liquid exposure to the liquid soluble adhesive;
   wherein the spring is configured to expose the flag distally from the front side upon a release of the liquid soluble adhesive;
   a pair of spaced apart projections disposed within the absorbent material proximal the back end;
   a pair of slats, each slat having:
      a head and a foot spaced apart from the head;
      a length greater than a distance from the front end to the back end; and
      a cutout disposed at the foot;

wherein each cutout is configured to removably engage one of the projections, respectively.

5. The appliance leak detector kit of claim 4 wherein the spring is a wire spring.

6. The appliance leak detector kit of claim 4 wherein the spring is a flat spring.

7. An appliance leak detector kit comprising:
a channel having a front side and a rear side spaced apart from the front side, a first end and a second end spaced apart from the first end, a top side and a bottom side spaced apart from the top side;
a wall disposed on the front side top side, the wall coplanar with the front side;
a pair of mirror image scallops, one of each of the pair of mirror image scallops disposed within and proximal each of the first end and the second end, respectively, each scallop of the pair of scallops open from the rear side to proximal the front side;
a longitudinal division disposed continuously within the rear side proximal the bottom side;
a pair of spaced apart holes disposed in the rear side proximal the top side;
a first slot and a second slot spaced apart from the first slot, the first slot and second slot disposed longitudinally and approximately centrally within the front side;
a spring disposed within the channel, the spring having an origin and a terminus spaced apart from the origin, the origin disposed within the pair of holes, the terminus extended without the first slot;
a flagpole having an origination and a termination spaced apart from the origination, the origination affixed to the terminus;
a flag disposed adjacent the termination;
a liquid soluble adhesive disposed within the channel wherein the liquid soluble adhesive is configured to retain the flag within the channel and the second slot;
an absorbent material having a front end and a back end spaced apart from the front end, a first side and a second side spaced apart from the first side, the front end removably disposed continuously within the longitudinal division, the front end and adjacent the front end in contact with the liquid soluble adhesive and the flag;
wherein the flag is configured to release from the liquid soluble adhesive upon a liquid exposure to the liquid soluble adhesive;
wherein the spring is configured to expose the flag distally from the front side upon a release of the liquid soluble adhesive;
a pair of spaced apart projections disposed within the absorbent material proximal the back end;
a pair of identical slats, each slat of the pair of slats having:
a primary end and a secondary end spaced apart from the primary end;
a length greater than a distance from the front end to the back end; and
a cutout disposed in the primary end;
wherein each cutout is configured to removably engage one of the projections of the pair of projections, respectively.

* * * * *